(12) United States Patent
Bornn et al.

(10) Patent No.: US 12,557,792 B2
(45) Date of Patent: Feb. 24, 2026

(54) BEEHIVE ENCLOSURE AND HIVE BODY

(71) Applicant: Apiverte Inc., Quebec (CA)

(72) Inventors: Sandra Bornn, La Peche (CA);
Michael Smith, La Peche (CA)

(73) Assignee: Apiverte Inc. (CA)

( * ) Notice: Subject to any disclaimer, the term of this
patent is extended or adjusted under 35
U.S.C. 154(b) by 0 days.

(21) Appl. No.: 18/674,392

(22) Filed: May 24, 2024

(65) Prior Publication Data

US 2024/0389557 A1 Nov. 28, 2024

Related U.S. Application Data

(60) Provisional application No. 63/504,604, filed on May
26, 2023.

(51) Int. Cl.
A01K 47/02 (2006.01)
A01K 47/06 (2006.01)

(52) U.S. Cl.
CPC .............. A01K 47/02 (2013.01); A01K 47/06
(2013.01)

(58) Field of Classification Search
CPC ........ A01K 47/06; A01K 47/02; A01K 49/00;
A01K 59/00; A01K 47/00
USPC ...................................................... 449/33, 38
See application file for complete search history.

(56) References Cited

U.S. PATENT DOCUMENTS

| | | | | | |
|---|---|---|---|---|---|
| 193,856 | A | * | 8/1877 | Deardorff | A01K 47/02 |
| | | | | | 449/37 |
| 375,269 | A | * | 12/1887 | Danzenbaker | A01K 47/06 |
| | | | | | 449/15 |
| 1,144,878 | A | * | 6/1915 | Tenyak | A01K 47/00 |
| | | | | | 449/20 |
| 1,490,126 | A | * | 4/1924 | Penney | A01K 47/00 |
| | | | | | 449/38 |
| 3,105,977 | A | * | 10/1963 | Root | A01K 47/00 |
| | | | | | 449/33 |
| 5,993,288 | A | * | 11/1999 | Shmuelli | A01K 47/00 |
| | | | | | 449/26 |
| 2017/0354127 | A1 | * | 12/2017 | Woods | A01K 53/00 |
| 2019/0166806 | A1 | * | 6/2019 | Burkett | A01K 47/06 |
| 2022/0132812 | A1 | * | 5/2022 | Stach | A01K 47/02 |
| | | | | | 449/3 |
| 2023/0217905 | A1 | * | 7/2023 | Palmby | A01K 47/06 |
| | | | | | 449/15 |
| 2024/0245039 | A1 | * | 7/2024 | Beck | A01K 47/06 |

* cited by examiner

*Primary Examiner* — Joshua J Michener
*Assistant Examiner* — Nicole Paige Maccrate
(74) *Attorney, Agent, or Firm* — Bradley Arant Boult
Cummings LLP; Daniel E. Sineway; Micah B. Hensley

(57) ABSTRACT

There is provided a hive body or a kit for assembling a hive
body for use in a beehive enclosure, comprising: panels
defining an interior space and an aperture configured to
allow movement of the bees into the interior space; a brood
chamber emplaced within the interior space, the brood
chamber defining an internal cavity adapted for housing
comb frames, and being displaceable between a stored
position within the interior space and an inspection position
when said brood chamber is displaced outwards from within
the interior space to permit a beekeeper access to internal
cavity of the brood chamber; and a rear door moveable
between a closed position to an open position which enables
the brood chamber to be moved into the inspection position
where the beekeeper can have access to internal cavity of the
brood chamber to maintain the bees.

20 Claims, 13 Drawing Sheets

2

30

20

74

90

92

56c

80

56b

78

56a

70

72

52

14

42

30

2

30

12

14

52

30

42

LEGEND

Warm Air

Warming Air

Cold Air

BEEHIVE ENCLOSURE AND HIVE BODY

CROSS-REFERENCE TO RELATED APPLICATIONS

The application claims priority to U.S. provisional patent application No. 63/504,604 filed May 26, 2023, the contents of which are incorporated by reference in their entirety.

TECHNICAL FIELD

The present invention relates to a beehive enclosure and hive body, kits and methods for assembling a hive body and a beehive enclosure, and methods for maintaining the health of one or more bee colonies.

BACKGROUND

Keeping honeybees in a backyard or a commercial setting can be challenging. The most commonly used system of beekeeping in North America involves housing honeybees in Langstroth hives comprising a plurality of boxes where each the boxes contain a series of vertically hanging honeycomb frames. As a bee colony grows, additional Langstroth boxes are needed and are stacked on top of each other. Every 10-14 days from spring until fall, the boxes need to be lifted and then unstacked to perform detailed health inspections of the boxes, including the bottom most box. Boxes can weigh upwards of 40 kg at the peak of the season and there can be more than 5 boxes per colony. The weight of these heavy boxes becomes a barrier for beekeepers in maintaining the health of their colonies at the time of the season when it is most essential.

Another problem facing all beekeepers using known and commercially hives is the requirement to have specialized equipment and tools and that the beekeeper have fine motor skills in order to access the honeycomb frames.

Another problem facing all beekeepers is protecting the bee colony (or bee colonies) from disease. For example, catastrophic colony diseases like American Foulbrood (AFB) that affect one colony means that the entire colony and all the equipment must be destroyed to prevent contamination of other nearby colonies to preserve the biosecurity of the apiary.

One goal facing beekeepers is to produce honey in a controlled environment with desired temperatures and/or humidity to maintain consistency and quality of the produced honey.

There is a need for a solution that reduces the need to lift hive boxes for regular colony health maintenance and be an accessible option for differently enabled beekeepers, provide insight into health without disturbance to the colony, protect the colony from harsh temperature changes, protect the colony and colonies from colony affecting diseases, and shield the colony from external predators.

SUMMARY OF THE INVENTION

The present invention in its several embodiments and multiple aspects provides an improved beehive enclosure, improved beehive, and improved methods of keeping honeybees that address many of the disadvantages of the prior art.

Specifically, in some embodiments, there is provided a beehive enclosure that reduces the physical barriers to keeping healthy honeybee colonies. In some aspects, the beehive enclosure reduces the need to lift hive boxes for regular colony health maintenance and be an accessible option for differently enabled beekeepers, provide insight into health without disturbance to the colony, protect the colony from harsh temperature changes, and shield the colony from external predators.

In some embodiments, there is provided a beehive enclosure that reduces physical requirements to ensure healthy honeybee colonies and is suitable for and can accommodate large and prolonged honey flows. In some aspects, the beehive enclosure includes one or more of a removable brood chamber, removable chamber dividers, removable honey chamber screens, and interlocking chamber dividers and doors that are easily and quickly operable by a beekeeper requiring only gross motor skills, and without the need to remove gloves and without the need for specialized equipment. In some aspects, the removable brood chamber and/or the removable honey chamber screens reduces the beekeeper's effort to maintain healthy honey bee colonies.

In some aspects, there is provided a hive body that includes a brood chamber mounted using sliding rails to enable brood chamber removal from the enclosure and top down viewing and inspection of the brood by the beekeeper. In some aspects, the brood chamber is removable dimensioned to receive standard frames, such as for example, Langstroth equipment.

In some embodiments, there is provided a hive body for use in a beehive enclosure, the hive body comprising internal passages for directing and moving air throughout to maintain an environment with desired temperatures and/or humidity.

In some embodiments, there is provided a hive body for use in a beehive enclosure comprising a front exterior panel including an opening dimensioned to allow bees to move therethrough and supports for mounting the hive body to the front exterior panel, the hive body comprising:

a floor panel, a top panel, side panels, and a front panel having an aperture configured to allow movement of the bees into an interior space defined by the floor panel, the top panel, the side panels, and the front panel, the hive body further comprising:

a brood chamber emplaced within the interior space, the brood chamber including end panels and side panels connected to the end panels and defining an internal cavity adapted for housing comb frames, said brood chamber being displaceable between a stored position within the interior space of the hive body and an inspection position when said brood chamber is displaced outwards from within the interior space of the hive body of the hive body to permit a beekeeper access to internal cavity of the brood chamber; and a rear door moveable between a closed position to an open position which enables the brood chamber to be moved into the inspection position where the beekeeper can have access to internal cavity of the brood chamber to maintain the bees.

In one aspect, the brood chamber is displaceable between the stored position and the inspection position by horizontal translation of the brood chamber relative to the hive body.

In one aspect, the side panels of the brood chamber and the side walls of the hive body comprise cooperating rails or telescoping rails to enable the horizontal translation of the brood chamber relative to the hive body such that the beekeeper can view the internal cavity of the brood chamber from the top down.

In one aspect, the hive body further comprising a queen excluder emplaced over the brood chamber, wherein the queen excluder is dimensioned to keep bees or a queen bee within the internal cavity of the brood chamber; and a honey chamber emplaced over the brood chamber, and a divider separating the honey chamber from the brood chamber, the honey chamber adapted for supporting housing honeycomb frames.

In one aspect, the rear door is configured to matingly couple with the queen excluder and the divider when the rear door is moved into the closed position.

In one aspect, the queen excluder and the divider each comprise an overhang portion that extends outwardly beyond the length of the side panels of the brood chamber, wherein the overhang portion comprises slots and the rear door comprises elongate protrusions that extend along the length of the door, wherein the elongate protrusions are configured to matingly couple with the slots in the overhang portion when the door is moved in the closed position.

In one aspect, the hive body defines an exit aperture such that when the rear door is moved in the closed position there is an airway passage for moving cooler and/or less humid air entering by the aperture and into the brood chamber and the honey chamber and then moving warmer and/or more humid air within the brood chamber and the honey chamber up and away from the brood chamber and the honey chamber out through the exit aperture to cool and/or remove humidity from the brood chamber and the honey chamber.

In one aspect, the exit aperture is formed by a cut out at a rear end of the top panel.

In one aspect, the floor panel includes a cut out at a rear end of the floor panel, wherein the cut out at a rear end of the floor panel is configured to enable cooler and/or less humid air to enter and then move upwards in the hive body.

In one aspect, the queen excluder and the divider each comprise an overhang portion that extends outwardly beyond the length of the side panels of the brood chamber, wherein the overhang portion comprises elongated cut outs to allow upwards movement of air in the direction of the top panel from floor panel.

In one aspect, the hive body further comprising a rear screen for retaining bees within the honey chamber when mounted and for permitting beekeeper access to the first honey chamber when unmounted.

In one aspect, the rear door is pivotally mounted to the hive body or wherein the rear door comprises a top segment and a bottom segment, wherein the top segment is pivotally mounted to the top panel and the bottom segment is pivotally mounted to the floor panel.

In one aspect, the hive body is removable from the front exterior panel by disengaging the supports in the exterior panel from the front panel of the hive body.

In one aspect, the maintain the bees comprises handling, physical or visual inspection of the condition of the bees.

In some embodiments, there is provided a beehive enclosure comprising:

a front exterior panel including an opening dimensioned to allow bees to move therethrough;

a hive body mounted to the front exterior panel at a height above the ground that enables a beekeeper in a standing position to maintain the bees in the hive body, the hive body comprising:

a floor panel, a top panel, side panels, and a front panel having an aperture configured to allow movement of the bees into an interior space defined by the floor panel, the top panel, the side panels, and the front panel, the hive body further comprising:

a brood chamber emplaced within the interior space, the brood chamber including end panels and side panels connected to the end panels and defining an internal cavity adapted for housing comb frames, said brood chamber being displaceable between a stored position within the interior space of the hive body and an inspection position when said brood chamber is displaced outwards from within the interior space of the hive body; and a rear door moveable between a closed position to an open position which enables the brood chamber to be moved into the inspection position where the beekeeper can have access to internal cavity of the brood chamber to maintain the bees.

In some embodiments, there is provided a kit for assembling a hive body for use in a beehive enclosure comprising a front exterior panel including an opening dimensioned to allow bees to move therethrough and supports for mounting the hive body to the front exterior panel, the kit comprising instructions for using the kit and components for assembling the hive body comprising: a floor panel, a top panel, side panels, and a front panel having an aperture configured to allow movement of the bees into an interior space defined by the floor panel, the top panel, the side panels, and the front panel, a bottom, a top, side walls, the hive body further comprising: a brood chamber configured to be emplaced within the interior space, the brood chamber including end panels and side panels connected to the end panels and defining an internal cavity adapted for housing comb frames, said brood chamber being displaceable between a stored position within the interior space of the hive body and an inspection position when said brood chamber is displaced outwards from within the interior space of the hive body of the hive body to permit a beekeeper access to internal cavity of the brood chamber; and a rear door moveable between a closed position which enables the brood chamber to be moved into the inspection position where the beekeeper can have access to internal cavity of the brood chamber to maintain the bees.

In some embodiments, there is provided hive body for use in a beehive enclosure, the hive body comprising: a brood chamber adapted for receiving brood comb frames; a honey chamber adapted for receiving honeycomb frames, the honey chamber emplaced above the brood chamber; and internal passages for directing and moving air coming into the brood chamber up towards and through and then away from the honey chamber to cool and/or remove humidity from the brood chamber and the honey chamber.

BRIEF DESCRIPTION OF THE DRAWINGS

FIG. 1b shows a rear elevation view of the beehive enclosure of FIG. 1a;

FIG. 1c shows a side elevation view of the beehive enclosure of FIG. 1a;

FIG. 1d shows a front elevation view of the beehive enclosure of FIG. 1a;

FIG. 6b shows an enlarged portion of inset A in FIG. 6a;

FIG. 7b shows a top view of the hive body of FIG. 7a;

DETAILED DESCRIPTION

Figure 1A:
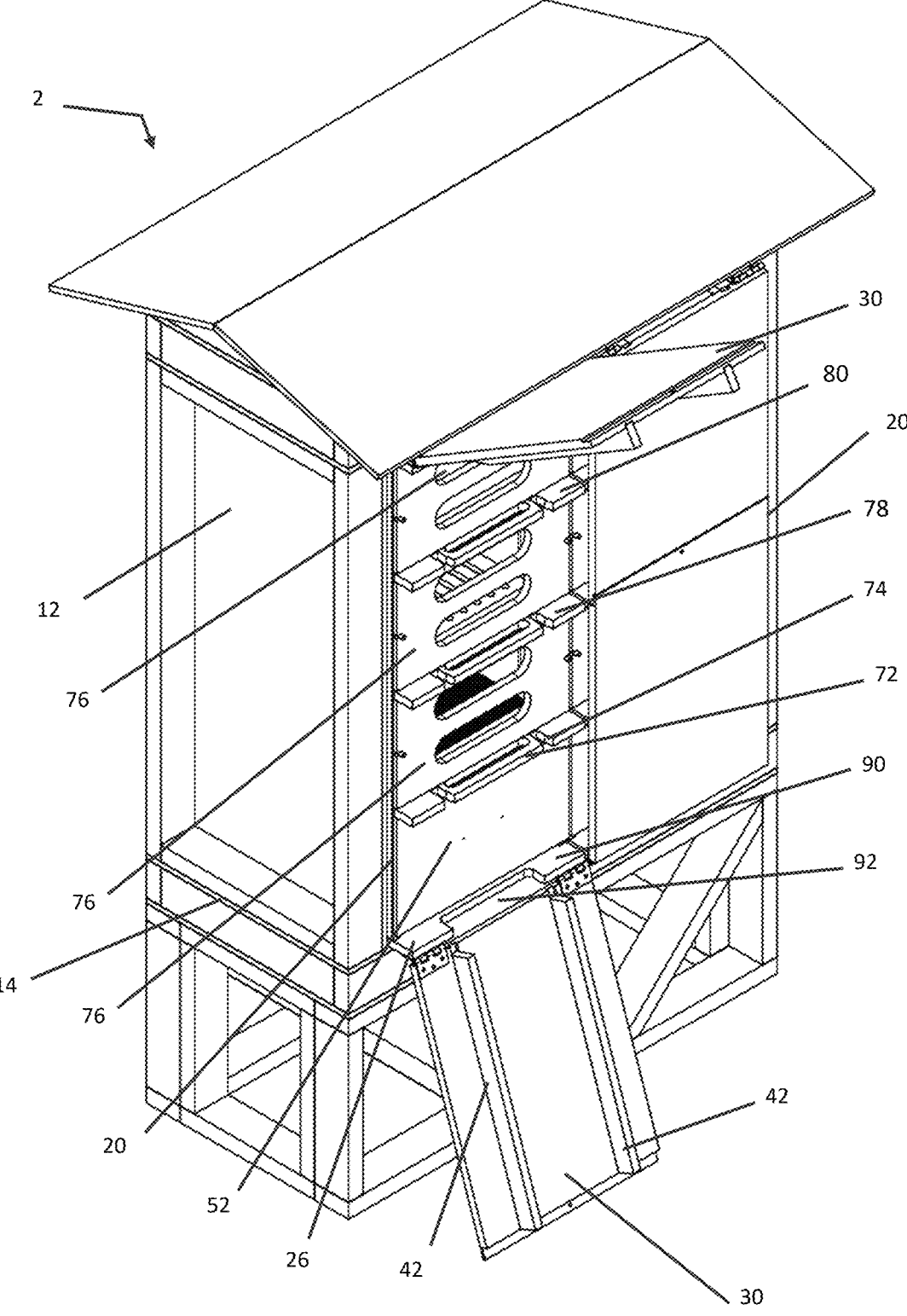
FIG. 1a shows a rear perspective view of a beehive enclosure according to one aspect of the invention.
Figure 1B:
Figure 1C:
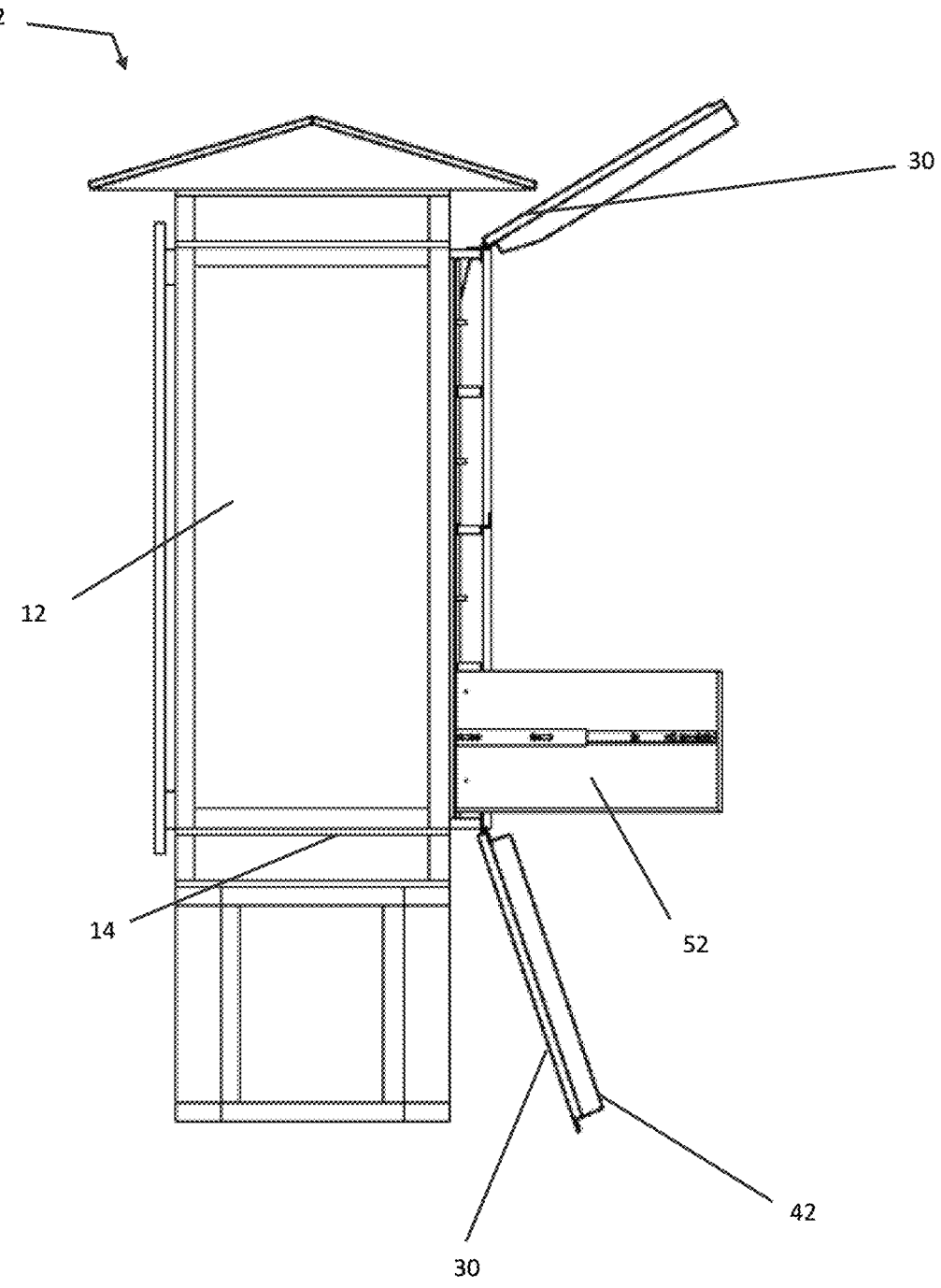
Figure 1D:
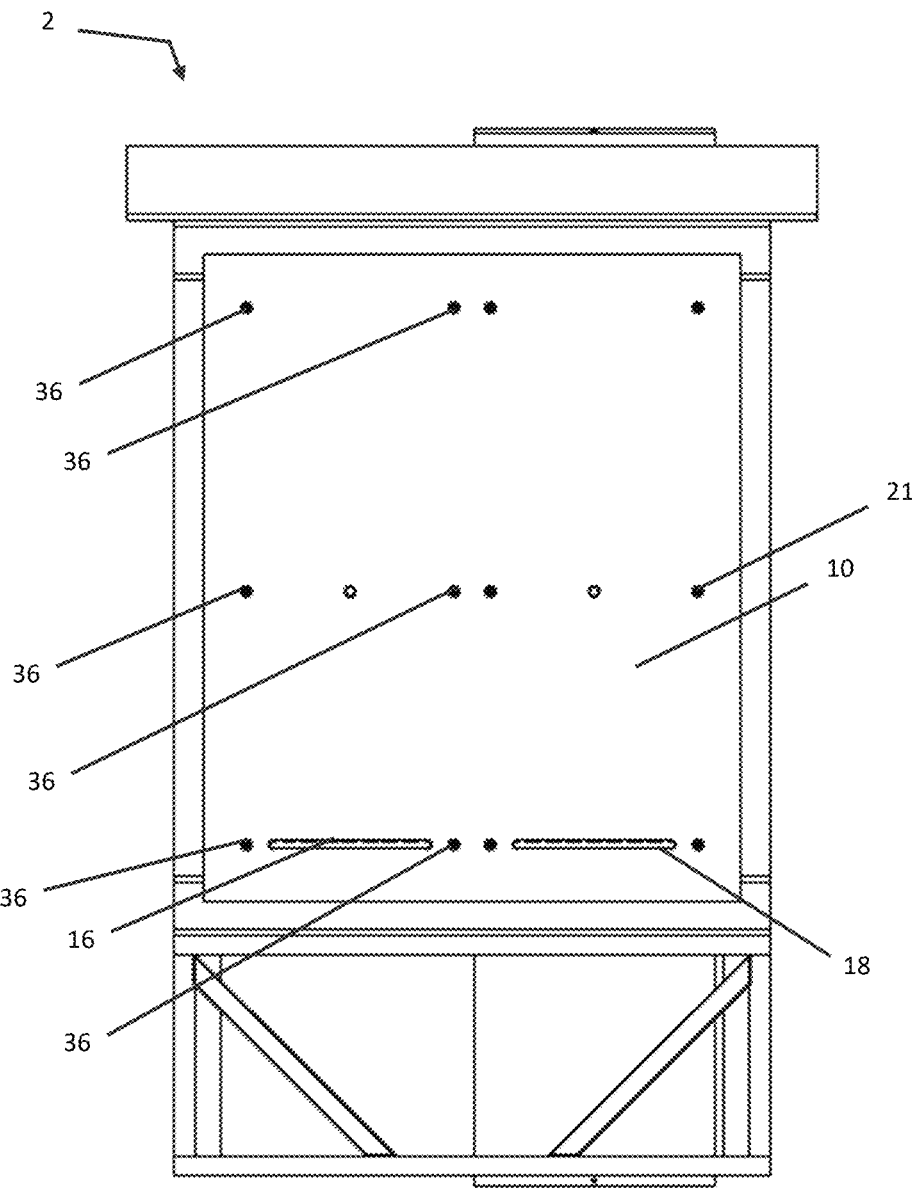

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the preferred, systems and methods are now described.

Unless otherwise specified, directional references herein refer to the beehive enclosure in an upright position. Reference will be made below in detail to exemplary embodiments of the invention, examples of which are illustrated in the accompanying drawings. Wherever possible, the same reference numerals used throughout the drawings refer to the same or like parts.

The present invention relates to a beehive enclosure, beehive bodies, and kits for assembling beehive enclosure and beehive bodies and methods thereof.

Figure 2:
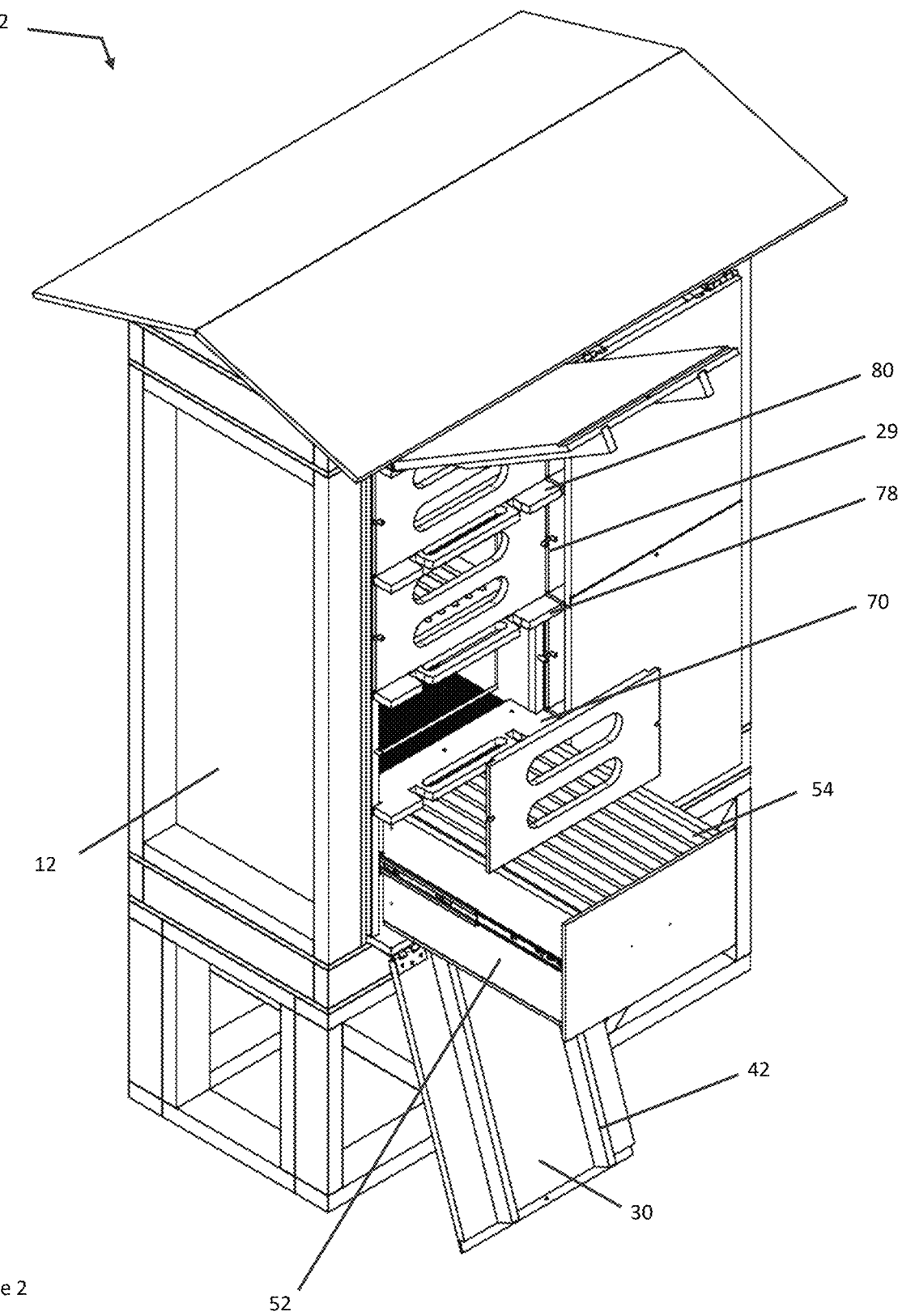
FIG. 2 shows a rear perspective view of a beehive enclosure according to FIG. 1a with the doors open.
Figure 3:
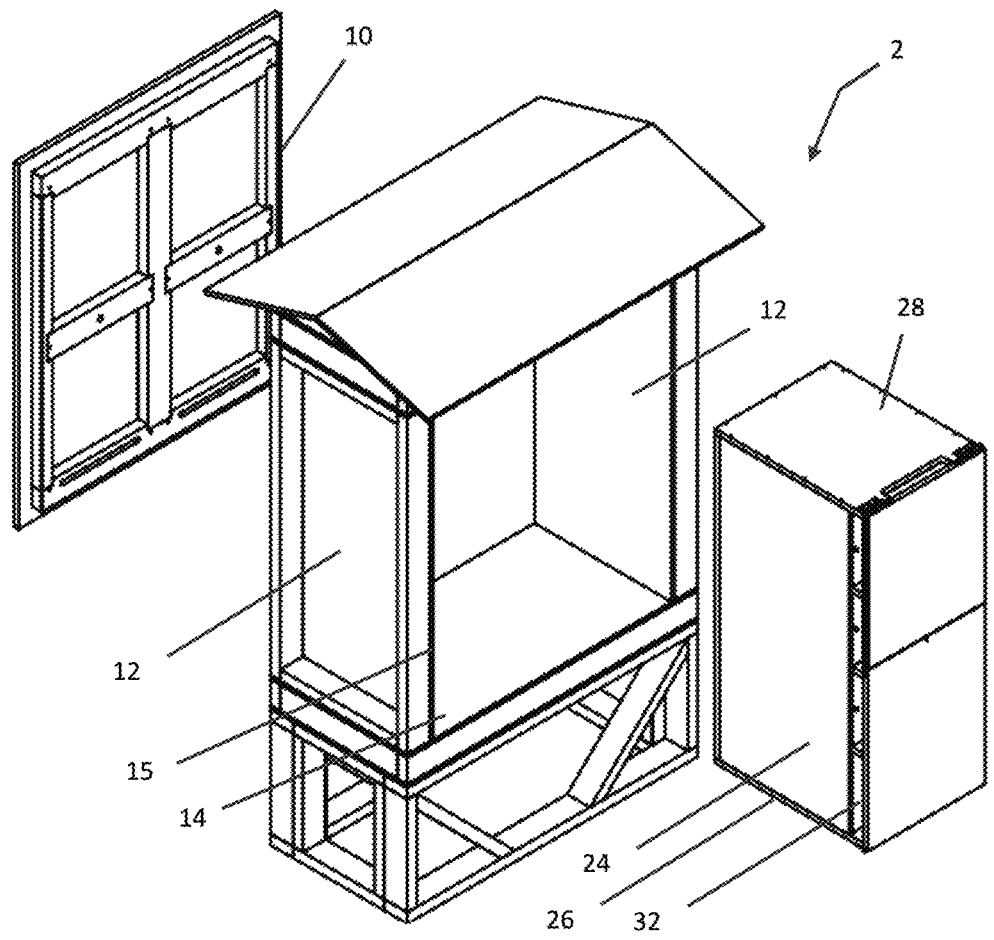
FIG. 3 shows an exploded rear perspective view of the enclosure shown in FIGS. 1 and 2.
Figure 4:
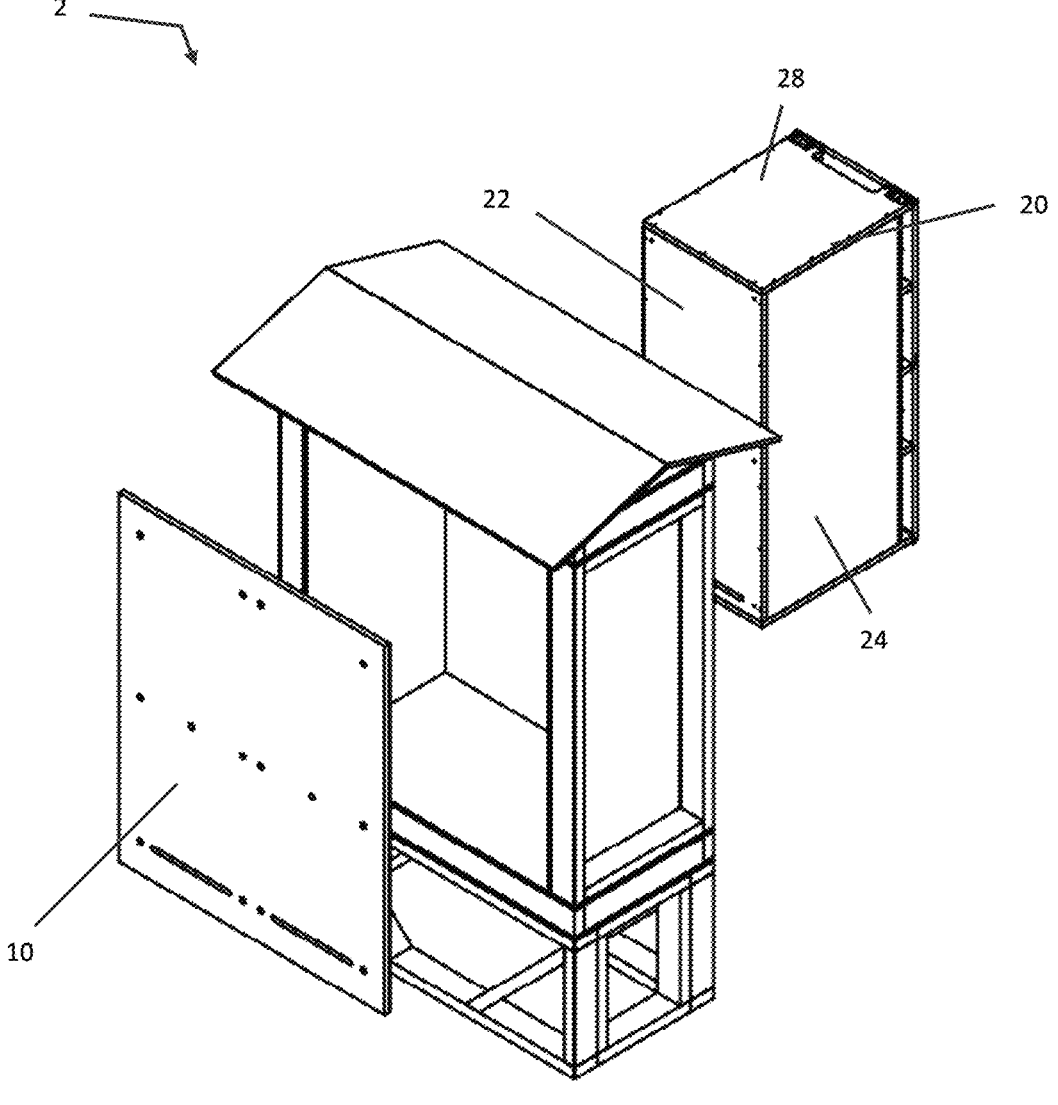
FIG. 4 shows an exploded front perspective view of the enclosure 10 shown in FIGS. 1 and 2

FIGS. 1a and 2 both show a rear perspective view of a beehive enclosure 2 according to one aspect of the invention. FIG. 3 shows an exploded rear perspective view of the enclosure 2 shown in FIGS. 1 and 2. FIG. 4 shows an exploded front perspective view of the enclosure 2 shown in FIGS. 1a and 2.

As shown in FIGS. 1 (1a through 1d) to 4, beehive enclosure 2 supports one hive body 20 or a plurality of hive bodies 20 emplaced in a side-by-side arrangement. In one aspect, the beehive enclosure 2 facilitates beekeeping by providing an upright, accessible enclosure 2 for easy handling, inspecting, and maintaining bees by a beekeeper.

With reference to FIG. 4, beehive enclosure 2 includes a front exterior panel 10, pair of side exterior walls 12, a floor 14, and an open side 15 opposite to the front exterior panel 10. The front exterior panel 10 is made from durable material resistant to weather and predatory animals and is configured to support one hive body 20 or a plurality of hive bodies 20, for example, using a plurality of bolts secured through bolt holes 21 formed in the front exterior panel 10. An aperture 16 is provided and is dimensioned to allow bees to enter/exit the beehive enclosure 2 and a landing pad 18 gives the bees a place to rest. The aperture 16 is configured to be in fluid communication with an interior space 32 of the hive body 20, as discussed below. The front exterior panel 10 and side exterior walls 12 includes insulation as desired so that the enclosure 2 can be maintained at a consistent temperature and/or desired moisture levels. The floor 14 is elevated off the ground, so that the hive body 20 is at a height of the working level that is comfortable for a standing the beekeeper and is also customizable to accommodate to any individualized physical ability condition.

Figure 5:
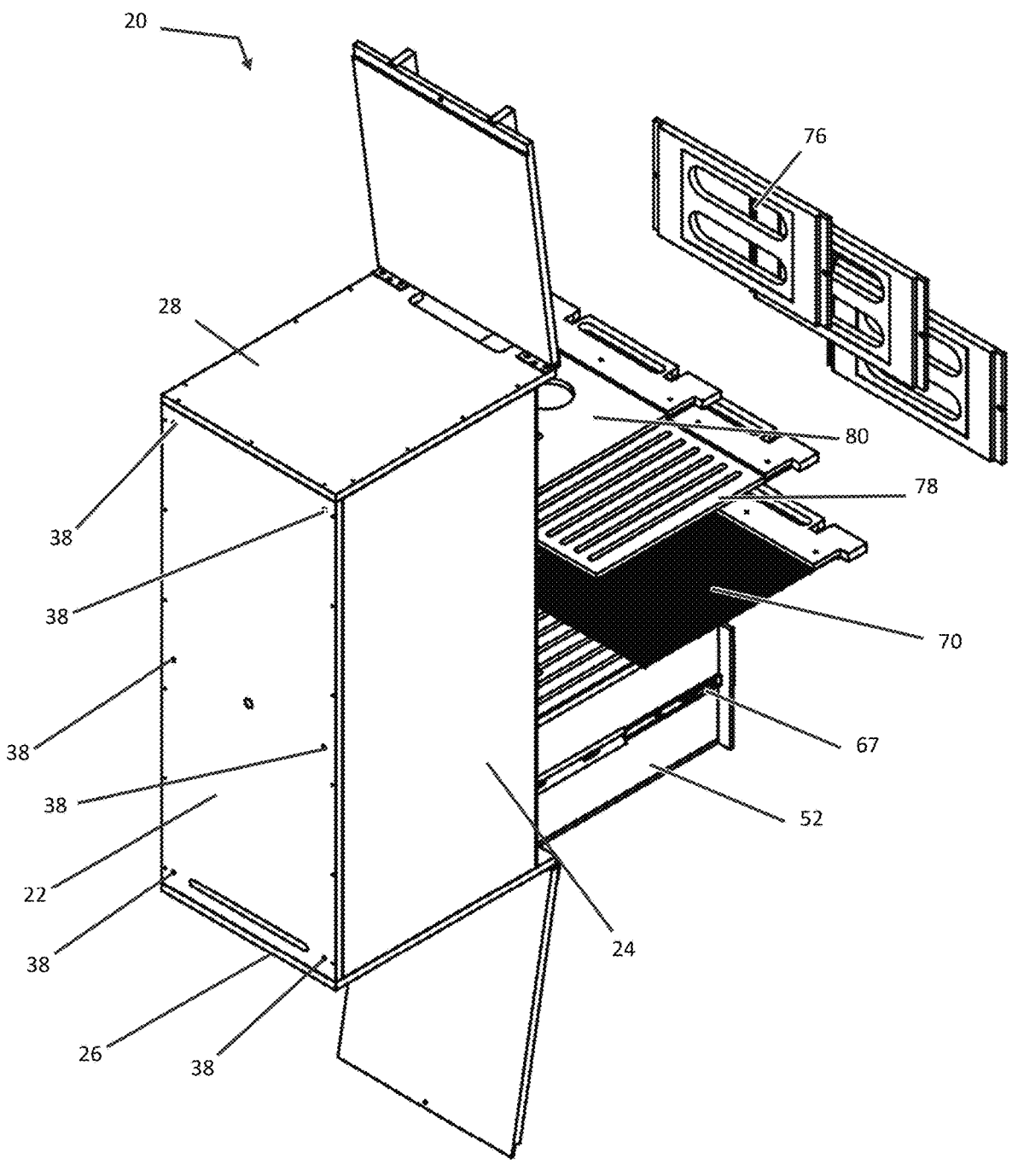
FIG. 5 shows an exploded rear perspective view of a hive body according to one aspect of the invention.

Turning to FIGS. 4 and 5, each hive body 20 comprises a front panel 22, side panels 24, a floor panel 26, a top panel 28, an open end 29 opposite the front panel 22, and one or more moveable covers or doors 30 at the open end. The hive body 20 defines the interior space 32 suitable for housing one or a plurality of vertically stacked chambers 50, as discussed below.

The front panel 22 includes an opening 34 that lines up with the aperture 16 of the front exterior panel 10 to permit bee movement into and out of the interior space 32 of the hive body 20.

The front panel 22 is mounted to the front exterior wall 10 by a plurality of cooperating of bolts 36 and nuts 38 to enable removal of the hive body 20 from the front exterior panel 10 independently from an adjacent hive body 20. In particular, each hive body 20 is supported internally to the front exterior panel 10 with the bolts 36 penetrating from the outside that join locking t-nuts 38 so that a user can detach each hive body 20 from the front exterior panel 10 and then remove the hive body 20 as a whole without needing access to the interior space 32 of the hive body 20 to minimize risks of biocontamination by American Foulbrood (AFB), for example, of adjacent hive bodies 20.

As shown in FIGS. 1 and 2, a pair of doors 30 include hinges 40 at one end to pivotally mount the doors 30 to the hive body 20. At the other end, each one of pair of doors 30 are adapted come together and pressure/press fit together. A pair of parallel elongate protrusions 42 extend along the length of the door are provided for reasons to be discussed in detail below. Doors 30 include one or more closure devices (not shown) to keep doors closed or to open the doors.

As shown in FIGS. 1, 2, 5, and 6 (6a and 6b), the interior space 32 is suitable for housing one or a plurality of vertically stacked chambers 50. As shown, there is one brood chamber 52 containing broom comb frames 54 and three honey chambers 56 vertically stacked over the brood chamber 52 containing honeycomb frames 58.

In particular, the brood chamber 52 is a substantially rectangular structure comprising a front panel 60, a rear panel 62, and side panels 64 defining an internal cavity 66 adapted for housing brood comb frames 54. The brood chamber being displaceable with respect to the hive body 20 where side panels 64 of the brood chamber 52 and the side walls 64 of the hive body 20 feature cooperating telescoping rails 67. In use, the brood chamber 52 is displaceable between a stored position in the interior space 32 of the hive body 20 and an inspection position when said brood chamber 52 is displaced out from within the hive body 20 to permit a beekeeper access to the internal cavity 66 of the brood chamber. In one aspect, to displace the brood chamber 52, the movement is similar to the motion of pulling out a cabinet drawer.

Figure 6A:
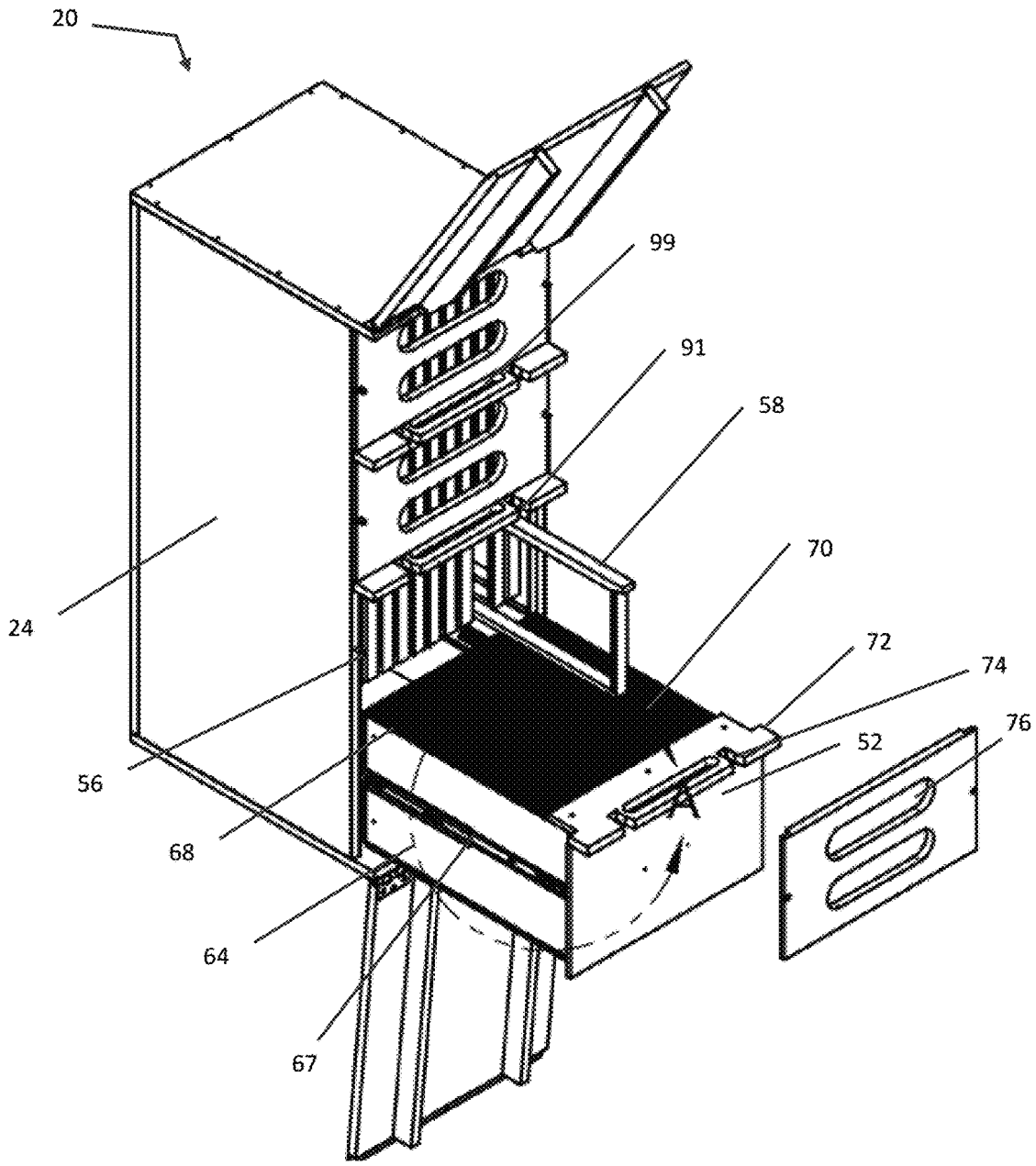
FIG. 6a shows a rear perspective view of a hive body according to one aspect of the invention with a brood chamber extending away from the hive body in an inspection position.
Figure 6B:
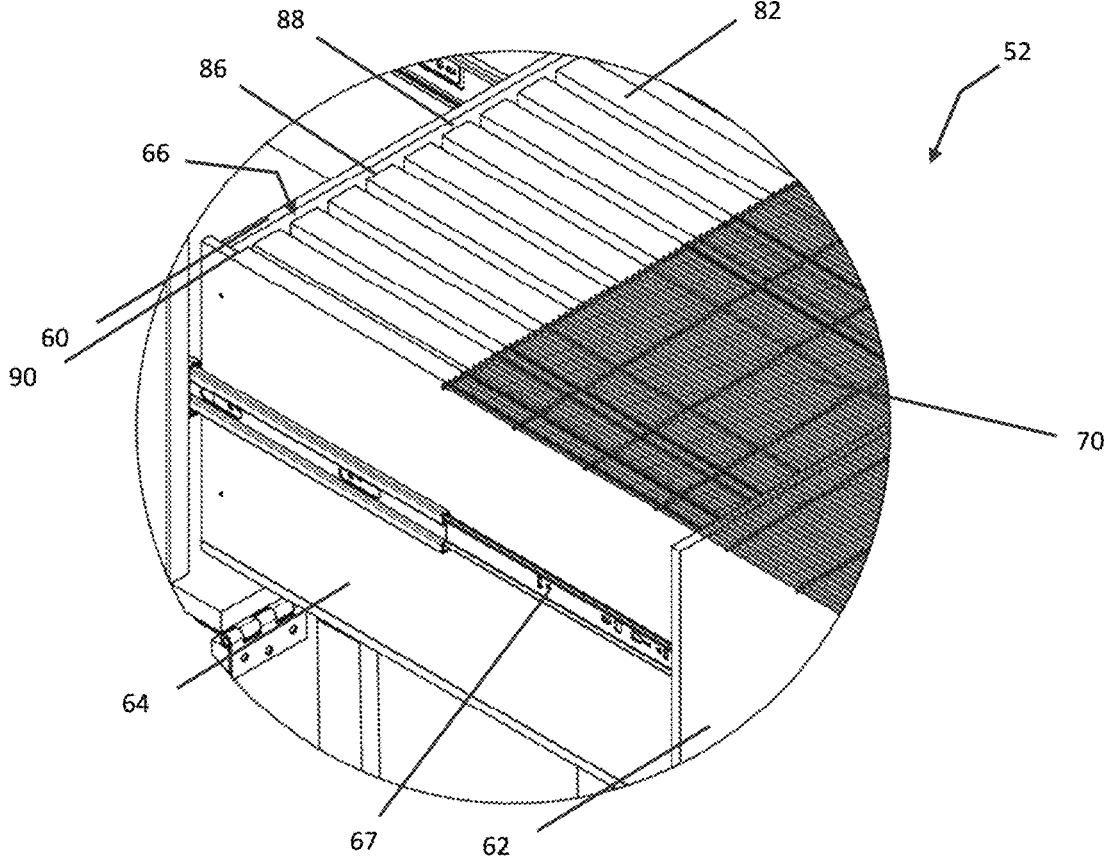

Turning to FIGS. 6 (6a and 6b) and 7 (7a through 7c), it will be seen that the brood chamber 52 defines an open top 68 which can be covered by a queen excluder 70 or a cover (not shown). When the cover is present in place of the queen excluder, the cover sealingly separates the brood chamber from the remainder of the interior of the hive body above to prevent bees from migrating from the brood chamber into the interior space above the brood chamber. The queen excluder 70 is a screen with pore size that is dimensioned to retain a queen bee within the internal cavity 66 of the brood chamber 52, but is also dimensioned to permit bees to migrate between the brood chamber 52 and the interior space 32 above the brood chamber 52. The queen excluder 70 and the cover include an overhang portion 72 because the length of the queen excluder 70 is greater than the length of the side panels 64 of the brood chamber 52. The overhang portion 72 includes a pair of slots 74 adapted to receive a portion of the parallel elongate protrusions 42 on the door 30, such that when the door 30 is closed, the parallel protrusions 42 fit snugly within the slots 74 and firmly closes the open end 29 of the hive body 20.

As shown in FIGS. 1, 2, 5, and 7 (7a through 7c), the interior space 32 above brood chamber 52 includes three honey chambers 56. Each honey chamber 56 is bounded by the front panel 22, the side panels 24, and a removable rear screen 76 that allows visual inspection into the honey chamber 56. A first honey chamber 56a is directly above the brood comb chamber 52 and is therefore also bounded by the queen excluder 70. Separating the first honeycomb chamber 56a from a second honeycomb chamber 56b is a slotted divider 78 that permits bees from migrating from the first honey comb chamber 56a to the second honey comb chamber 56b. Separating the second honeycomb chamber 56b from a third honey comb chamber 56c is a closed divider 80 that prevents any bees from migrating from the second honey comb 56b chamber to the third honey comb chamber 56c.

The dividers 78, 80 are similar to the queen excluder 70 and the cover in that the dividers 78, 80 also include the overhang portion 72 because the length of the dividers 78, 80 is greater than the length of the side panels 64 of the brood chamber 52 and also include the pair of slots 74 adapted to receive a portion of the parallel elongate protrusions 42 on the door 30, such that when the door 30 is closed, the parallel protrusions 42 fit snugly within the slots 74 and firmly closes the open end 29 of the hive body 20.

In use, during the initial growth stage, the beekeeper may choose to limit access of the bees to fewer than the total number of available honey chambers 56 to allow a bee colony to develop on the limited honeycomb frames 58 mounted in beehive enclosure 2. For example, in one aspect, when only one honey chamber 56 is needed, one closed divider 80 is provided that sealingly separates the first honey chamber 56a from the second honey chamber 56b. In this case, once the slotted divider 78 is mounted, bees in the brood chamber 52 may have access to the first honey chamber 56a but will not have access to any honeycomb chambers directly above. As the colony grows, the closed divider 80 is replaced with one slotted divider 78 so that the bees will now have access to the second honeycomb chamber 56a directly above. Access to the third honey chamber 56c is restricted until the colony grows further at which time, the closed divider 80 is replaced with one slotted divider 78 so that the bees will have access to the third honeycomb chamber 56c directly above.

FIG. 6a is a perspective view of enclosure 2 showing the arrangement of the brood comb frames 54 and the honeycomb frames 58 in the hive body 20 shown in FIGS. 1 through 4 according to an aspect of the invention.

The brood chamber 52 supports the brood comb frames 54 which include an upper wall 82, a lower wall 84 (not shown), and two opposing side walls 86 and substrate and/or surface useful for supporting honeycomb production framed by walls 82, 84, and 86. The upper wall 82 includes overhang portions 88 for attachment to a ledge 90 extending from one side panel 64 to the other side panel 64 of the brood chamber 52. Each of the brood comb frames 54 can be obtained when the beekeeper grasps the upper wall 82 and/or the overhang portions 88 to vertically lift the frame 54 in an upward motion, when the brood chamber is pulled outwards similar to a cabinet drawer.

The honey chamber 56 supports honeycomb frames 58, which may be similarly constructed as the brood comb frames 54, are mounted in the honey chamber 56 where each one of the honeycomb frames 58 are mounted over an elongated rod 91 extending from one side panel 24 to the other side panel 24. When mounted, each honeycomb frame 58 defines a plane that is substantially vertical; for instance, each comb frame 58 may define a plane substantially perpendicular to the plane of the top panel 24 and/or substantially parallel to the plane of the side panel 28. In one embodiment, the honeycomb frames 58 are adapted so as to be removed when a beekeeper reaches into the honey chamber 56 to grasp the honeycomb frame 58 and remove by horizontally translating the honeycomb frame 58 out from within the honey chamber 56. In one aspect, to displace the honeycomb frames 58, the movement is similar to the motion of pulling out book from a bookshelf.

In one aspect, the components of the beehive enclosure 2 and hive body 20 may be fabricated from wood, for example, plywood, but it is envisioned that enclosure 2 and hive body 20 may be fabricated from any convenient material that is durable and not prone to degradation and can be easily maintained and cleaned.

Figure 7A:
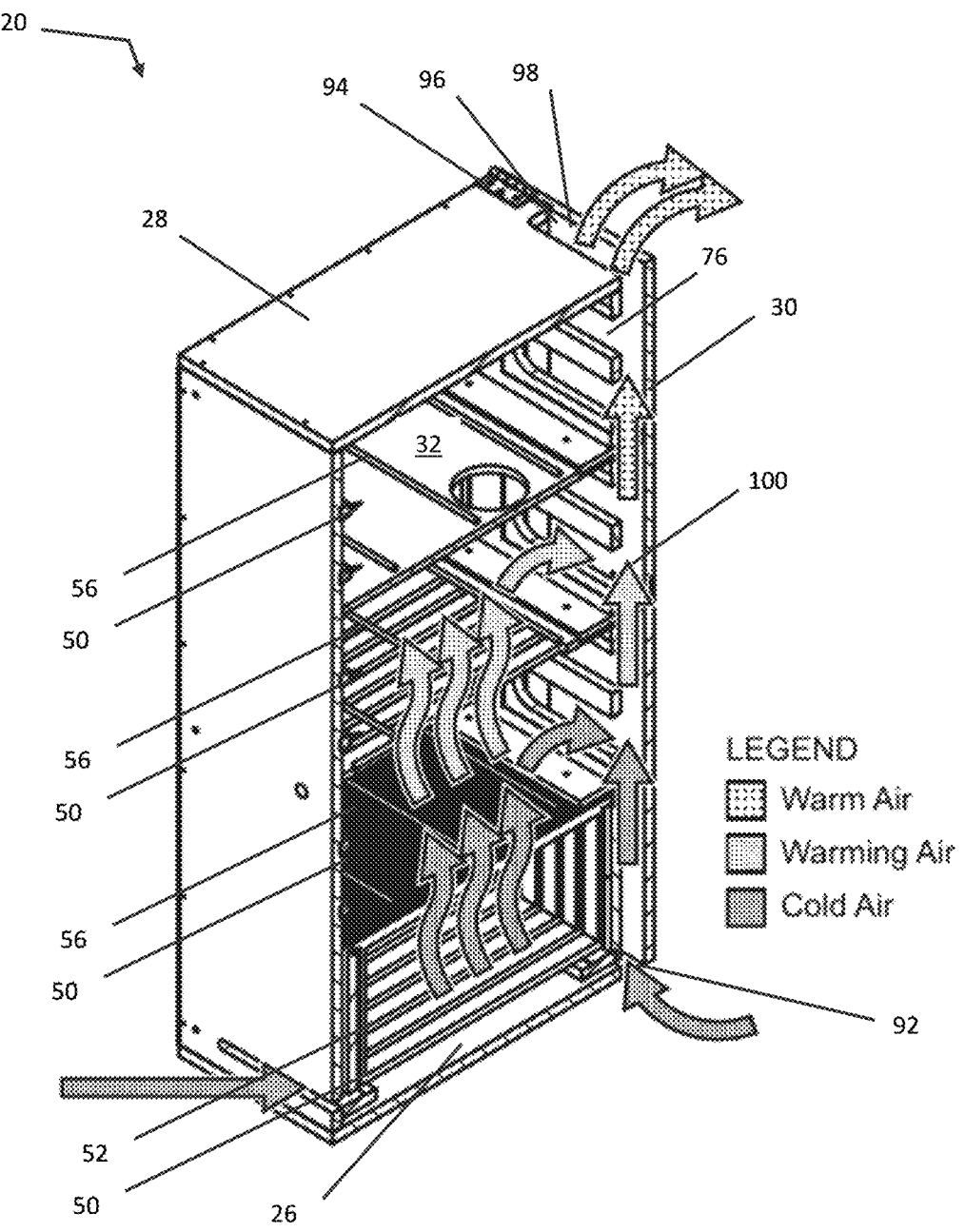
FIG. 7a is a schematic of the beehive enclosure with a sidewall removed to show the movement and direction air flow through the enclosure.
Figure 7B:
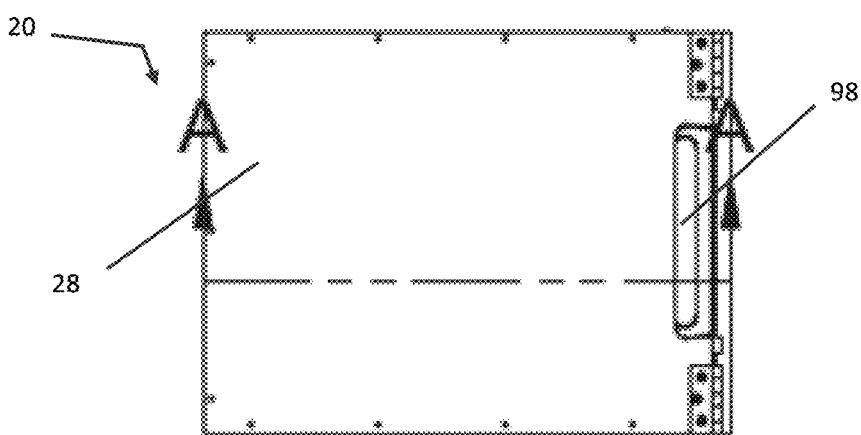
Figure 7C:
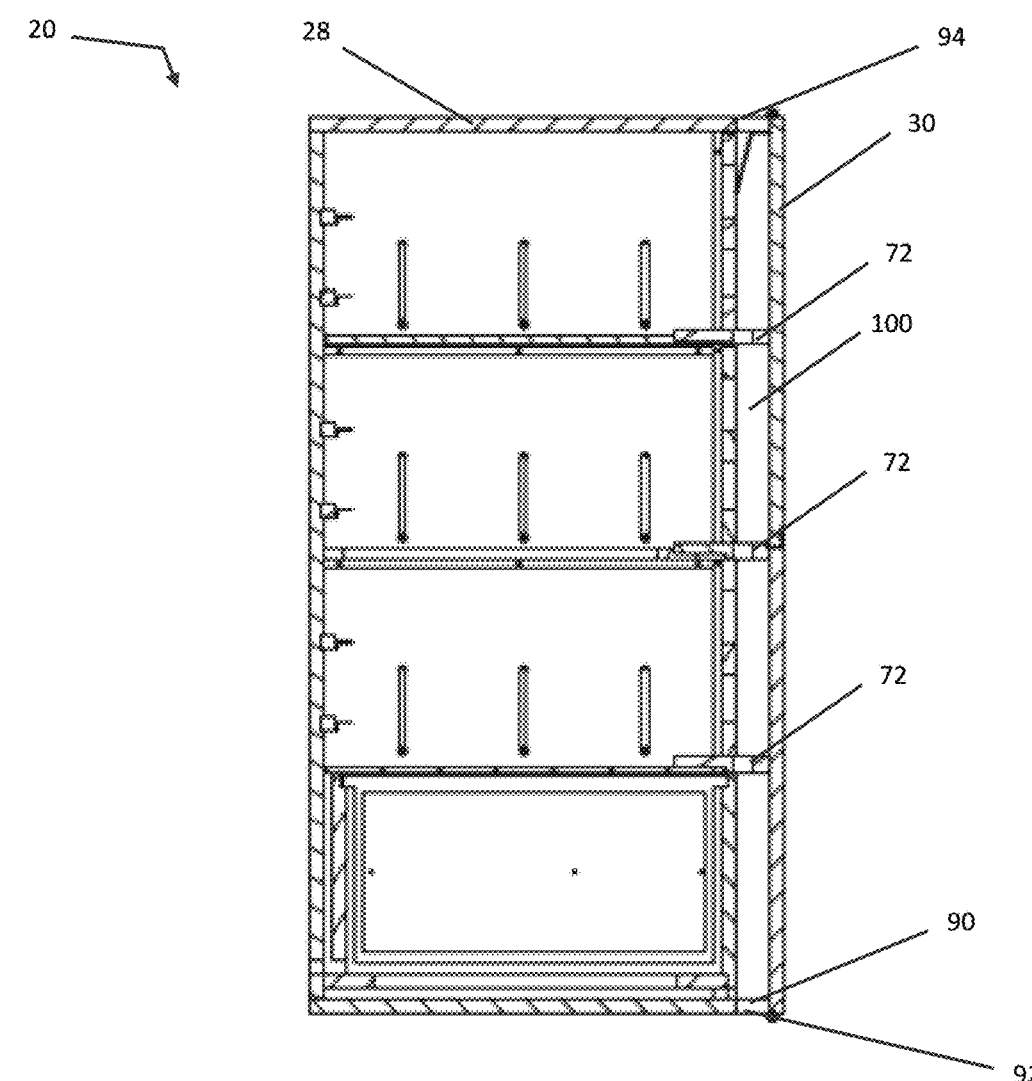
FIG. 7c is a cross-sectional view along the line A-A in FIG. 7b.

FIGS. 7a, 7b, and 7c show an embodiment of the beehive enclosure 2 comprising internal passages for directing and moving air throughout to maintain an environment with desired temperatures and/or humidity. In one aspect, the floor panel 26 of the hive body 20 has a rear overhang 90 because the floor panel 26 has a length that is greater than the length of the side panels 24. Rear overhang 90 includes an elongated cut out 92 at a rear end. The top panel 28 of the hive body 20 has a rear overhang 94 because the top panel 28 has a length that is greater than the length of the side panels 24. Rear overhang 94 includes an elongated cut out 96 at a rear end and defines an exit aperture 98 from which air can exit the hive body 20. Additionally, the overhang portion 72 includes an elongated cut out 99.

When the doors 30 of the hive body 20 are closed, the protrusions 42 fit into the corresponding slots 74 and the protrusions 42 abuts against rear panel 62 of the brood chamber 52 and the screens 76 of the honey chamber 56, the result is a plenum chamber 100 formed behind the doors 30. In one aspect, the plenum chamber 100 is substantially free from internal obstructions to freely permit air flow therethrough because the elongated cut outs 92, 96, and 99 allow movement of air between the hive body 20 and the closed doors 30.

As shown in FIGS. 7a, 7b, and 7c, when cooler air enters into the interior space 32 through the aperture 16 at the front exterior panel, the cooler air enters the brood chamber 52 from the bottom and it gradually heated as it moves into the interior space 32 via the brood chamber 52. As the cooler air moves though the hive body 20, the air is further warmed up and collects additional heat and/or moisture. The warmer air rises and exits through the screen doors 76 of the honeycomb chambers 56 and into the plenum chamber 100. Cooler air is also drawn into the plenum chamber 100 which is drawn in an upwards direction from bottom to top. The plenum chamber 100 terminates at the exit aperture 98. As consequence, the movement of air through the internal passages not only helps cure and remove excess moisture in the honey produced, but the effects also decrease the overall workload of the bees which otherwise would have to expend efforts to cure the honey and also improves the overall health of the bees, and the living conditions (e.g. temperature and humidity) of the enclosure.

Example

Figure 8:
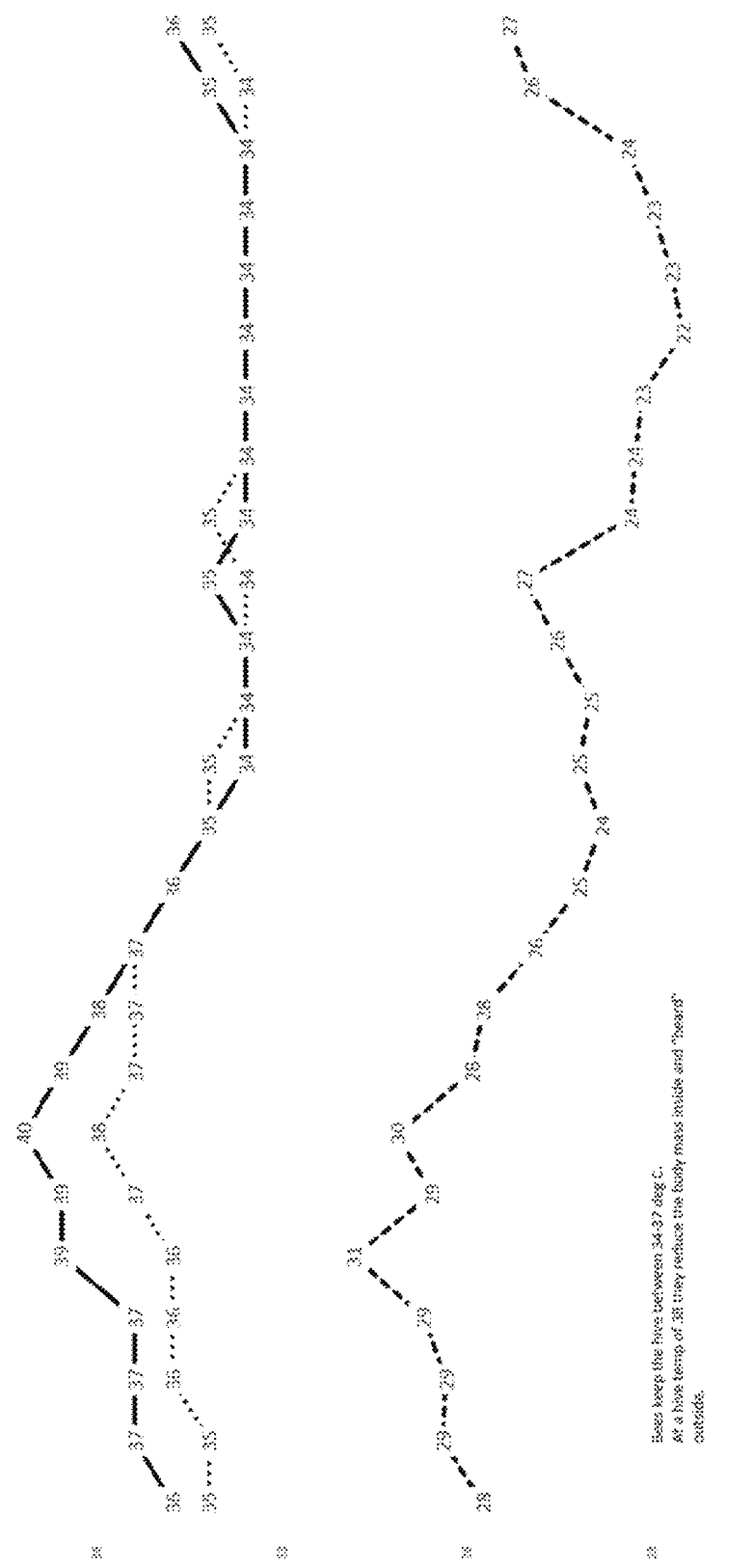
FIG. 8 is a graph showing the outside temperature and the internal temperatures of a Langstroth beehive with the beehive enclosure according to one aspect of the invention over a 24 hour period.

Bees tend to prefer hive temperatures of between about 34-37 deg C. and suitable conditions for the brood for form properly and ambient humidity for nectar to be evaporated to honey. However, when the hive temperature reaches about 38 deg C., the bees will reduce the body mass inside the beehive to make room inside the hive for added ventilation by accumulating outside in the beehive in a shape of "beard". FIG. 8 is a graph that shows the results of an experiment plotting the outside temperature and inside temperatures of a typical Langstroth beehive and an embodiment of the beehive enclosure according to the present invention over a 24-hour period during a summer day (July 20 to July 21). As shown, the maximum internal temperature of the Langstroth beehive is generally higher than the temperature inside inventive beehive enclosure at certain times of the day. As well, internal temperature of the Langstroth beehive fluctuates widely with changes in outside temperatures over time; on the other hand, the temperature inside the inventive beehive enclosure is comparatively much more stable over time.

The embodiments of the present application described above are intended to be examples only. Those of skill in the art may effect alterations, modifications and variations to the particular embodiments without departing from the intended scope of the present application. In particular, features from one or more of the above-described embodiments may be selected to create alternate embodiments comprised of a sub combination of features which may not be explicitly described above. In addition, features from one or more of the above-described embodiments may be selected and combined to create alternate embodiments comprised of a combination of features which may not be explicitly described above. Features suitable for such combinations and sub combinations would be readily apparent to persons skilled in the art upon review of the present application as a whole. Any dimensions provided in the drawings are provided for illustrative purposes only and are not intended to be limiting on the scope of the invention. The subject matter described herein and in the recited claims intends to cover and embrace all suitable changes in technology.

What is claimed is:

1. A hive body for use in a beehive enclosure comprising a front exterior panel including an opening dimensioned to allow bees to move therethrough and supports for mounting the hive body to the front exterior panel, the hive body comprising:

a floor panel, a top panel, side panels, and a front panel having an aperture configured to allow movement of the bees into an interior space defined by the floor panel, the top panel, the side panels, and the front panel, the hive body further comprising:

a brood chamber emplaced within the interior space, the brood chamber including end panels and side panels connected to the end panels and defining an internal cavity adapted for housing comb frames, said brood chamber being displaceable between a stored position within the interior space of the hive body and an inspection position when said brood chamber is displaced outwards from within the interior space of the hive body to permit a beekeeper access to the internal cavity of the brood chamber, wherein the brood chamber is displaceable between the stored position and the inspection position by horizontal translation of the brood chamber relative to the hive body;

a queen excluder emplaced over the brood chamber, wherein the queen excluder is dimensioned to keep the bees or a queen bee within the internal cavity of the brood chamber;

a honey chamber emplaced over the brood chamber;

a divider separating the honey chamber from the brood chamber, the honey chamber adapted for supporting housing honeycomb frames; and a rear door moveable between a closed position to an open position which enables the brood chamber to be moved into the inspection position to thereby provide the beekeeper access to the internal cavity of the brood chamber to maintain the bees, wherein the rear door is configured to matingly couple with the queen excluder and the divider when the rear door is moved into the closed position.

2. The hive body of claim 1 wherein the hive body defines an exit aperture such that when the rear door is moved in the closed position there is an airway passage for moving cooler and/or less humid air entering by the aperture and into the brood chamber and the honey chamber and then moving warmer and/or more humid air within the brood chamber and the honey chamber up and away from the brood chamber and the honey chamber out through the exit aperture to cool and/or remove humidity from the brood chamber and the honey chamber.

3. The hive body of claim 2 wherein the exit aperture is formed by a cut out at a rear end of the top panel.

4. The hive body of claim 2 wherein the floor panel includes a cut out at a rear end of the floor panel, wherein the cut out is configured to enable cooler and/or less humid air to enter and then move upwards in the hive body.

5. The hive body of claim 2 further comprising a rear screen for retaining bees within the honey chamber when mounted and for permitting beekeeper access to the honey chamber when unmounted.

6. The hive body of claim 2 wherein the rear door is pivotally mounted to the hive body or wherein the rear door comprises a top segment and a bottom segment, wherein the top segment is pivotally mounted to the top panel and the bottom segment is pivotally mounted to the floor panel.

7. The hive body of claim 1 wherein the side panels of the brood chamber and the side panels of the hive body comprise cooperating rails or telescoping rails to enable the horizontal translation of the brood chamber relative to the hive body to thereby enable the beekeeper to view the internal cavity of the brood chamber from a position above the brood chamber.

8. The hive body of claim 1 wherein the queen excluder and the divider each comprise an overhang portion that extends outwardly beyond a length of the side panels of the brood chamber, wherein the overhang portion comprises slots and the rear door comprises elongate protrusions that extend along a length of the rear door, wherein the elongate protrusions are configured to matingly couple with the slots in the overhang portion when the rear door is moved in the closed position.

9. The hive body of claim 1 wherein maintaining the bees comprises handling the bees, physically inspecting a condition of the bees, or visually inspecting the condition of the bees.

10. A hive body for use in a beehive enclosure comprising a front exterior panel including an opening dimensioned to allow bees to move therethrough and supports for mounting the hive body to the front exterior panel, the hive body comprising:

a floor panel, a top panel, side panels, and a front panel having an aperture configured to allow movement of the bees into an interior space defined by the floor panel, the top panel, the side panels, and the front panel, the hive body further comprising:

a brood chamber emplaced within the interior space, the brood chamber including end panels and side panels connected to the end panels and defining an internal cavity adapted for housing comb frames, said brood chamber being displaceable between a stored position within the interior space of the hive body and an inspection position in which said brood chamber is displaced outwards from the interior space of the hive body to thereby permit a beekeeper access to the internal cavity of the brood chamber;

a queen excluder emplaced over the brood chamber, wherein the queen excluder is dimensioned to keep the bees or a queen bee within the internal cavity of the brood chamber; a honey chamber emplaced over the brood chamber; and a divider separating the honey chamber from the brood chamber, the honey chamber adapted for supporting housing honeycomb frames; and a rear door moveable between a closed position and an open position which enables the brood chamber to transition between the stored position and the inspection position, wherein the rear door is configured to matingly couple with the queen excluder and the divider when the rear door is moved into the closed position.

11. The hive body of claim 10 wherein the queen excluder and the divider each comprise an overhang portion that extends outwardly beyond a length of the side panels of the brood chamber, wherein the overhang portion comprises slots and the rear door comprises elongate protrusions that extend along a length of the rear door, wherein the elongate protrusions are configured to matingly couple with the slots in the overhang portion when the rear door is moved in closed position.

12. The hive body of claim 11 wherein the hive body defines an exit aperture such that when the rear door is moved in the closed position there is an airway passage for moving cooler and/or less humid air entering by the aperture and into the brood chamber and the honey chamber and then moving warmer and/or more humid air within the brood chamber and the honey chamber up and away from the brood chamber and the honey chamber out through the exit aperture to cool and/or remove humidity from the brood chamber and the honey chamber.

13. The hive body of claim 12 wherein the exit aperture is formed by a cut out at a rear end of the top panel.

14. The hive body of claim 12 wherein the floor panel includes a cut out at a rear end of the floor panel, wherein the cut out is configured to enable cooler and/or less humid air to enter and then move upwards in the hive body.

15. A beehive enclosure comprising:
a hive body comprising:

a floor panel, a top panel, side panels, and a front panel having an aperture configured to allow movement of bees into an interior space defined by the floor panel, the top panel, the side panels, and the front panel, the hive body further comprising:

a brood chamber emplaced within the interior space, the brood chamber including end panels and side panels connected to the end panels and defining an internal cavity adapted for housing comb frames, said brood chamber being displaceable between a stored position within the interior space of the hive body and an inspection position when said brood chamber is displaced outwards from within interior space of the hive body;

a queen excluder emplaced over the brood chamber, wherein the queen excluder is dimensioned to keep the bees or a queen bee within the internal cavity of the brood chamber;

a honey chamber emplaced over the brood chamber;

a divider separating the honey chamber from the brood chamber, the honey chamber adapted for supporting housing honeycomb frames; and a rear door moveable between a closed position and an open position which enables the brood chamber to be moved into the inspection position to thereby provide a beekeeper access to the internal cavity of the brood chamber to maintain the bees, wherein the rear door is configured to matingly couple with the queen excluder and the divider when the rear door is moved into the closed position;

a front exterior panel including an opening dimensioned to allow the bees to move therethrough; and supports for mounting the hive body to the front exterior panel at a height above ground level that enables a beekeeper in a standing position to maintain the bees in the hive body.

16. The beehive enclosure of claim 15 wherein the queen excluder and the divider each comprise an overhang portion that extends outwardly beyond a length of the side panels of the brood chamber, wherein the overhang portion comprises slots and the rear door comprises elongate protrusions that extend along a length of the rear door, wherein the elongate protrusions are configured to matingly couple with the slots in the overhang portion when the rear door is moved in the closed position.

17. The beehive enclosure of claim 16 wherein the hive body defines an exit aperture such that when the rear door is moved in the closed position there is an airway passage for moving cooler and/or less humid air entering by the aperture and into the brood chamber and the honey chamber and then moving warmer and/or more humid air within the brood chamber and the honey chamber up and away from the brood chamber and the honey chamber out through the exit aperture to cool and/or remove humidity from the brood chamber and the honey chamber.

18. The beehive enclosure of claim 17 wherein the exit aperture is formed by a cut out at a rear end of the top panel.

19. The beehive enclosure of claim 17 wherein the floor panel includes a cut out at a rear end of the floor panel, wherein the cut out is configured to enable cooler and/or less humid air to enter and then move upwards in the hive body.

20. The beehive enclosure of claim 15 wherein the hive body is removable from the front exterior panel by disengaging the supports in the front exterior panel from the front panel of the hive body.

* * * * *